US012345222B1

(12) United States Patent
Halsmer

(10) Patent No.: US 12,345,222 B1
(45) Date of Patent: Jul. 1, 2025

(54) ENHANCEMENTS FOR CARBURETED AND RETROFIT ELECTRONIC FUEL INJECTION AIRCRAFT ENGINES

(71) Applicant: John P. Halsmer, Columbus, IN (US)

(72) Inventor: John P. Halsmer, Columbus, IN (US)

( * ) Notice: Subject to any disclaimer, the term of this patent is extended or adjusted under 35 U.S.C. 154(b) by 0 days.

(21) Appl. No.: 19/044,126

(22) Filed: Feb. 3, 2025

(51) Int. Cl.

| | |
|---|---|
| ***F02M 17/38*** | (2006.01) |
| ***F02M 35/10*** | (2006.01) |
| ***F02M 37/04*** | (2006.01) |
| ***F02M 71/00*** | (2006.01) |

(52) U.S. Cl.
CPC ...... *F02M 35/10118* (2013.01); *F02M 17/38* (2013.01); *F02M 35/10026* (2013.01); *F02M 35/10268* (2013.01); *F02M 35/10373* (2013.01); *F02M 37/04* (2013.01); *F02M 71/00* (2013.01)

(58) Field of Classification Search
CPC ............. F02M 35/10118; F02M 17/38; F02M 35/10026; F02M 35/10268; F02M 35/10373; F02M 37/04; F02M 71/00; F02M 71/02; F02M 71/04
See application file for complete search history.

(56) References Cited

U.S. PATENT DOCUMENTS

| | | | | |
|---|---|---|---|---|
| 2,879,047 | A | 3/1959 | Wagner | |
| 3,166,059 | A | 1/1965 | Botterud, Jr. | |
| 3,604,405 | A | 9/1971 | Maher | |
| 4,157,084 | A | 6/1979 | Wallis | |
| 5,010,867 | A * | 4/1991 | Johstoneaux | F02M 37/0088 123/514 |
| 5,133,905 | A | 7/1992 | Woody et al. | |
| 5,803,022 | A | 9/1998 | Nelson et al. | |
| 7,290,531 | B2 | 11/2007 | Halsmer | |
| 2005/0247292 | A1 * | 11/2005 | Halsmer | F02M 71/00 123/478 |
| 2017/0058818 | A1 | 3/2017 | Halsmer | |
| 2017/0114763 | A1 | 4/2017 | Mueller | |

* cited by examiner

*Primary Examiner* — Jacob M Amick
(74) *Attorney, Agent, or Firm* — Barnes & Thornburg

(57) ABSTRACT

An engine system includes an engine, a carburetor induction system, and a controller. The carburetor induction system is fluidly coupled to the engine to provide an air-fuel mixture thereto. The carburetor induction system includes a pump configured to provide a leaner air-fuel mixture to the engine. The controller is configured to adjust operation of the pump.

20 Claims, 3 Drawing Sheets

ENHANCEMENTS FOR CARBURETED AND RETROFIT ELECTRONIC FUEL INJECTION AIRCRAFT ENGINES

FIELD OF THE DISCLOSURE

The present disclosure relates generally to enhancements for carbureted and retrofit electronic fuel injection aircraft engines.

BACKGROUND

Internal combustion engines are used to power different kinds of vehicles, including aircraft. Carburetion and fuel injection are the two main types of fuel delivery systems used in internal combustion engines. Carbureted engines mix air and fuel before the mixture is delivered to the engine's cylinders. Electronic fuel injection engines rely on engine control systems to operate fuel injectors, which provides a means for automating air and fuel mixing for more precise fuel delivery.

Although engines of modern vehicles commonly use electronic fuel injection systems to supply fuel for combustion, internal combustion engines of aircraft generally use carburetors or mechanical fuel injection systems. This is due to significant costs of component and certification requirements for electronic fuel injection (EFI) systems. Typically, carburetors or mechanical fuel injection systems require monitoring and controlling by the pilot during flight, which presents safety and accuracy issues. Electronic fuel injection systems are beneficial, adding safety, durability, and increased efficiency for use in aircraft; but are significantly more expensive.

There are many aircraft engines that would benefit from modification resulting in precise automatic air and fuel mixing control at a reasonable cost. Precise air and fuel mixing control provides improved performance, efficiency, reliability, and safety of the engine.

SUMMARY

The present disclosure may comprise one or more of the following features and combinations thereof.

An engine system for an aircraft may comprise an engine, a carburetor induction system, an electronic fuel injection (EFI) system, and a controller. The engine may have a plurality of cylinders configured to receive an air-fuel mixture. The carburetor induction system may be fluidly coupled to the engine and configured to selectively provide a naturally-aspirated air-fuel mixture to the plurality of cylinders. The carburetor induction system may include a chamber into which a naturally-aspirated fuel flow from a fuel tank is drawn, an intake manifold that receives air from an environment and selectively receives the naturally-aspirated fuel flow from the chamber, and a venturi located in the intake manifold through which the air and the naturally-aspirated fuel flow is received.

In some embodiments, the electronic fuel injection (EFI) system may be fluidly coupled to the engine and configured to selectively provide an electronically-controlled air-fuel mixture to the plurality of cylinders. The EFI system may include a pump that selectively draws an electronically-controlled fuel flow from the fuel tank and a fuel injector that receives the electronically-controlled fuel flow from the pump and injects the electronically-controlled fuel flow into the intake manifold. The controller may be configured to change the engine system between (i) a carburetor mode in which the venturi draws the naturally-aspirated fuel flow into the intake manifold from the chamber to mix with the air therein and provide the naturally-aspirated air-fuel mixture to the plurality of cylinders while the fuel injector does not inject the electronically-controlled fuel flow into the intake manifold and (ii) an EFI mode in which the pump draws the electronically-controlled fuel flow from the fuel tank for injection into the intake manifold via the fuel injector to mix with the air therein and provide the electronically-controlled air-fuel mixture to the plurality of cylinders while the venturi does not draw the naturally-aspirated fuel flow into the intake manifold from the chamber.

In some embodiments, the carburetor induction system may include a pump fluidly coupled to the chamber and configured to remove chamber air from the chamber to decrease pressure in the chamber while the engine system is in the carburetor mode so that an amount of the naturally-aspirated fuel flow directed into the intake manifold is decreased thereby providing a leaner air-fuel mixture to the engine so that the efficiency of the engine system can be increased. The carburetor induction system may further include a plenum configured to direct the air into the intake manifold. The plenum may include a main section having an inlet to receive the air from the environment and a tapered section coupled to the main section and the intake manifold to direct the air from the main section and into the intake manifold. The tapered section may decrease in diameter from the main section to the intake manifold.

In some embodiments, the engine system may further comprise a heating unit configured to supply heated air to the intake manifold. The controller may be in communication with the heating unit and may be configured to change the heating unit between an on mode in which the heated air is directed to the intake manifold and an off mode in which the heated air is not directed to the intake manifold. The controller may be configured to change the heating unit to the on mode to direct the heated air from the heating unit to the intake manifold while the engine system is in the carburetor mode and the EFI mode.

In some embodiments, the pump of the EFI system and the fuel injector of the EFI system may be retrofit onto the aircraft. The fuel injector of the EFI system may be located upstream of the venturi of the carburetor induction system. The controller may be in communication with the pump of the carburetor induction system. The controller may be configured to direct the pump of the carburetor induction system to remove the chamber air from the chamber in response to inputs from at least one sensor indicative of operating conditions of the aircraft. The at least one sensor may comprise a manifold absolute pressure (MAP) sensor, a mass airflow (MAF) sensor, an intake air temperature (IAT) sensor, or a tachometer. The controller may be configured to change the engine system from the EFI mode to the carburetor mode in response to inputs from at least one sensor indicative of failure of the pump of the EFI system or the fuel injector of the EFI system.

According to another aspect of the present disclosure, an engine system for an aircraft may comprise an engine, a carburetor induction system, and a controller. The engine may have a plurality of cylinders configured to receive an air-fuel mixture. The carburetor induction system may be fluidly coupled to the engine and configured to selectively provide a naturally-aspirated air-fuel mixture to the plurality of cylinders. The carburetor induction system may include a chamber into which a naturally-aspirated fuel flow from a fuel tank is drawn, an intake manifold that receives air from an environment and selectively receives the naturally-aspirated fuel flow from the chamber, a venturi located in the intake manifold through which the air and the naturally-aspirated fuel flow is received, and a pump fluidly coupled to the chamber and configured to remove chamber air from the chamber to decrease pressure in the chamber so that an amount of the naturally-aspirated fuel flow directed into the intake manifold is decreased thereby providing a leaner air-fuel mixture to the engine so that the efficiency of the engine system can be increased.

In some embodiments, the controller may be in communication with the pump and configured to adjust an amount of the chamber air removed from the chamber by the pump based, at least in part, on operating conditions of the aircraft. The carburetor induction system may further include a plenum configured to direct the air into the intake manifold. The plenum may include a main section having an inlet to receive the air from the environment and a tapered section coupled to the main section and the intake manifold to direct the air from the main section and into the intake manifold. The tapered section may decrease in diameter from the main section to the intake manifold.

In some embodiments, the engine system may further comprise a heating unit configured to supply heated air to the intake manifold. The controller may be in communication with the heating unit and may be configured to change the heating unit between an on mode in which the heated air is directed to the intake manifold and an off mode in which the heated air is not directed to the intake manifold. The controller may be configured to change the heating unit to the on mode to direct the heated air from the heating unit to the intake manifold during all operating conditions of the aircraft.

In some embodiments, the engine system may further comprise at least one sensor in communication with the controller and configured to provide inputs to the controller indicative of the operating conditions of the aircraft.

In some embodiments, the engine system may further comprise an electronic fuel injection (EFI) system fluidly coupled to the engine and configured to selectively provide an electronically-controlled air-fuel mixture to the plurality of cylinders. The EFI system may include a pump that selectively draws an electronically-controlled fuel flow from the fuel tank and a fuel injector that receives the electronically-controlled fuel flow from the pump and injects the electronically-controlled fuel flow into the intake manifold.

In some embodiments, the controller may be configured to change the engine system between (i) a carburetor mode in which the venturi draws the naturally-aspirated fuel flow into the intake manifold from the chamber to mix with the air therein and provide the naturally-aspirated air-fuel mixture to the plurality of cylinders while the fuel injector does not inject the electronically-controlled fuel flow into the intake manifold and (ii) an EFI mode in which the pump draws the electronically-controlled fuel flow from the fuel tank for injection into the intake manifold via the fuel injector to mix with the air therein and provide the electronically-controlled air-fuel mixture to the plurality of cylinders while the venturi does not draw the naturally-aspirated fuel flow into the intake manifold from the chamber.

In some embodiments, a fuel injector nozzle of the EFI system may be located upstream of a throttle valve of the carburetor induction system located within the intake manifold. The pump of the EFI system and the fuel injector of the EFI system may be retrofit onto the aircraft.

These and other features of the present disclosure will become more apparent from the following description of the illustrative embodiments.

DETAILED DESCRIPTION

Figure 1:
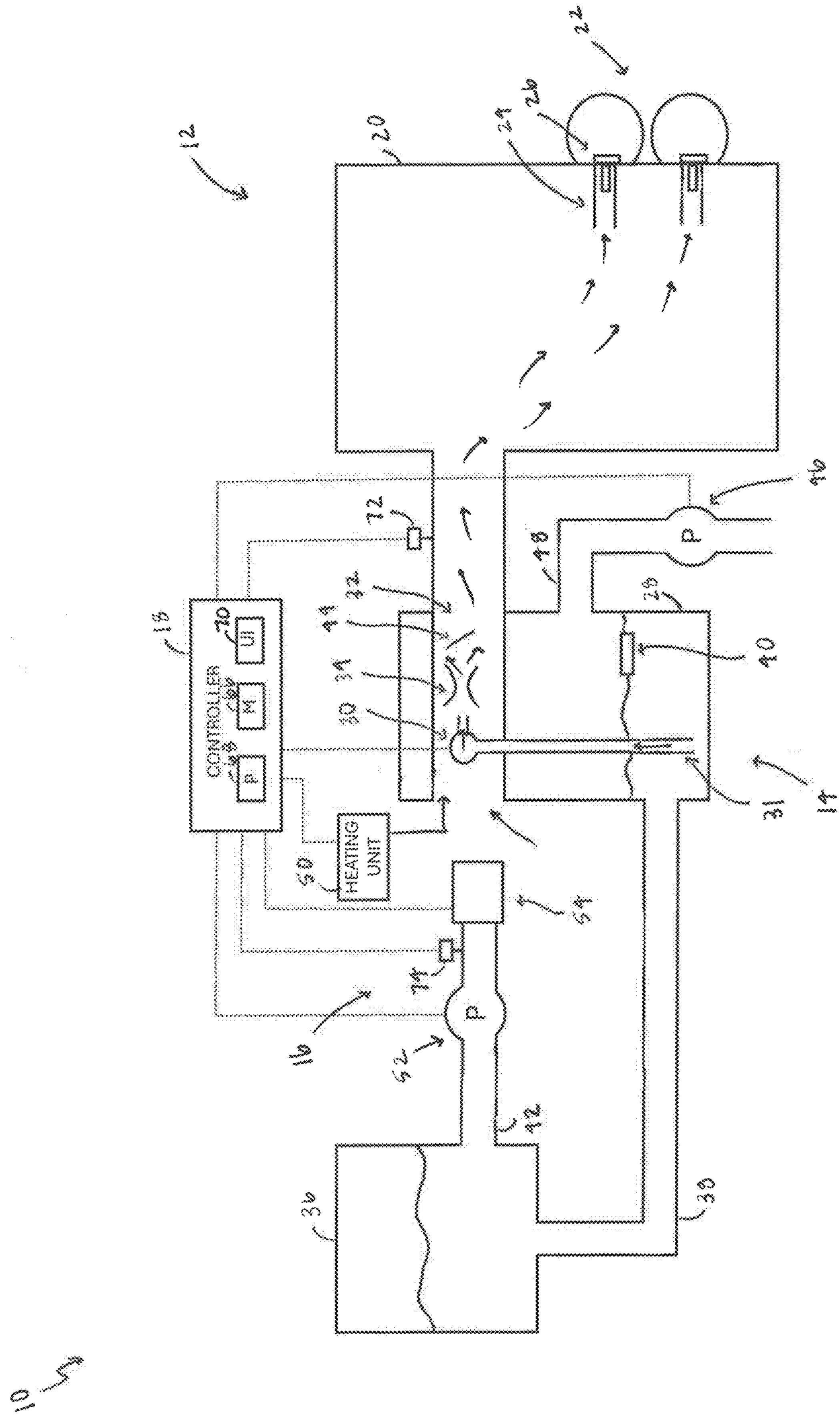
FIG. 1 is a diagrammatic view of the engine system in a carburetor mode, the engine system including a carburetor induction system, an electronic fuel injection (EFI) system, and a controller configured to change the engine system between the carburetor mode, as shown in FIG. 1, and an EFI mode, as shown in FIG. 2, and further showing that, in the carburetor mode, fuel is drawn from a chamber into an intake manifold via a venturi to mix with air, and the air-fuel mixture is directed to an engine of the engine system.

For the purposes of promoting an understanding of the principles of the disclosure, reference will now be made to a number of illustrative embodiments illustrated in the drawings and specific language will be used to describe the same.

Figure 2:
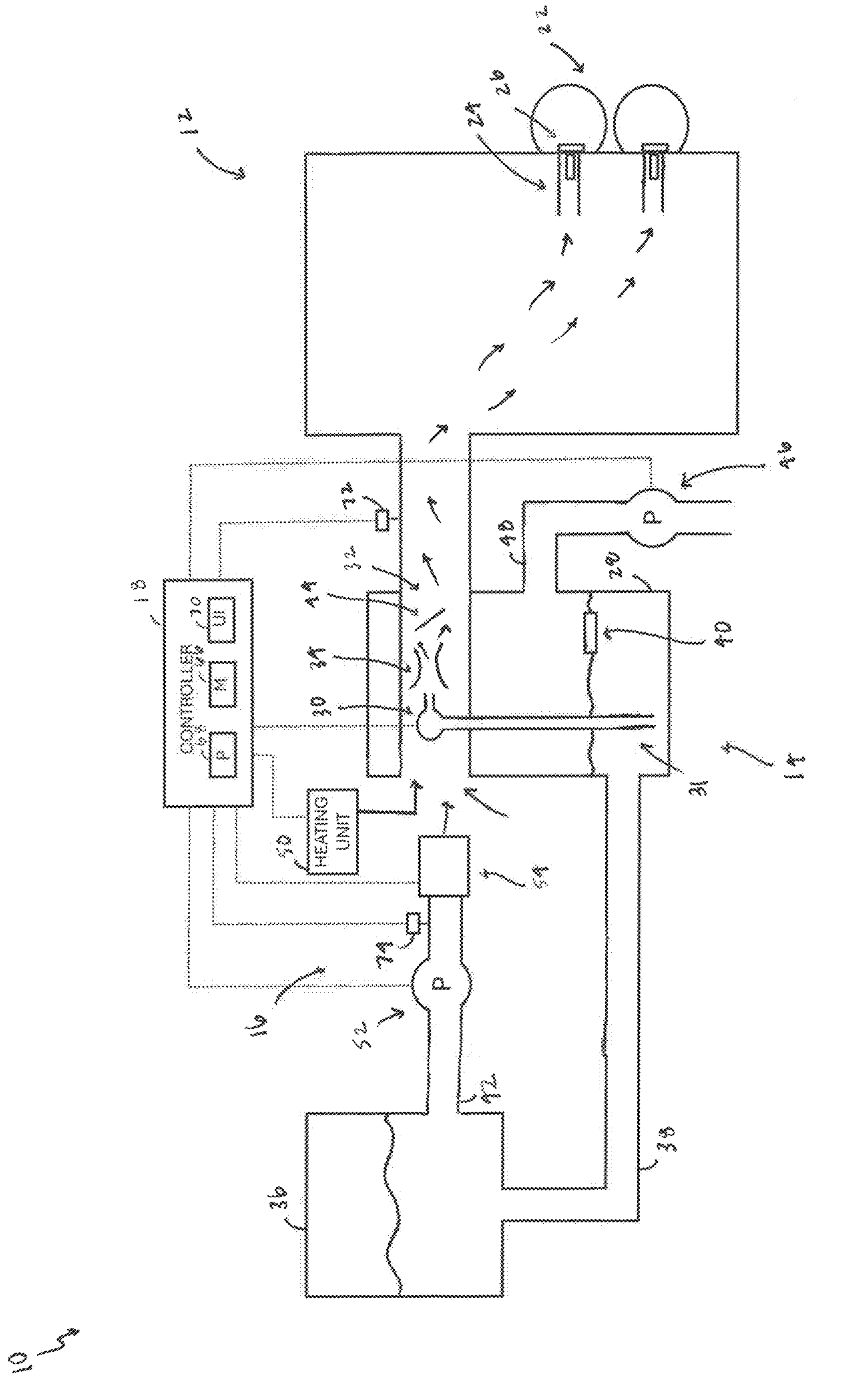
FIG. 2 is a diagrammatic view of the engine system of FIG. 1 in the EFI mode showing that, in the EFI mode, fuel is directed through fuel injectors via a pump and into the intake manifold to mix with air, and the air-fuel mixture is directed to the engine of the engine system.

An illustrative engine system 10 includes an engine 12, a carburetor induction system 14, an electronic fuel injection (EFI) system 16, and a controller 18, as shown in FIGS. 1 and 2. The engine 12 burns fuel to generate power. The carburetor induction system 14 and the EFI system 16 are both fluidly coupled to the engine 12 to provide an air-fuel mixture to the engine 12. The controller 18 selectively controls the carburetor induction system 14 and the EFI system 16 so that either the carburetor induction system 14 or the EFI system 16 provides the air-fuel mixture to the engine 12. In preferred embodiments, the carburetor induction system 14 and the EFI system 16 do not operate at the same time.

In some embodiments, the engine system 10 is used on an aircraft. In some embodiments, the engine system 10 is used on a vehicle other than an aircraft.

Some aircrafts use carbureted engines. However, these carbureted engines lack precision that is provided by EFI engines, thereby leading to decreased fuel efficiency in comparison to EFI engines. For example, carbureted engines lack automatic, continuous mixture adjustment during operation of the engine system 10. Some aircrafts use EFI systems. However, these EFI systems require backup systems in the event that components of the EFI engine malfunction during use. Thus, the engine system 10 includes the carburetor induction system 14 for mechanical backup, requiring no electrical power to operate in failure emergencies. Further, the present disclosure provides for a practical, less expensive way to update a carbureted aircraft to be an EFI system, thereby providing the benefits of EFI systems at a reduced cost. This reduced cost may be around 50% reduction (on average), varying with applications.

The controller 18 is configured to change the engine system 10 between a carburetor mode, as shown in FIG. 1, and an EFI mode, as shown in FIG. 2. In exemplary embodiments, the EFI mode is the primary mode and the carburetor mode is the backup mode.

In some embodiments, the engine system 10 changes between the carburetor mode and the EFI mode via manual switching. In such an embodiment, the pilot pushes the mixture control in the aircraft, which turns on the fuel to the carburetor induction system 14, and the pilot switches off the electrical switch controlling the EFI system 16, if there is a failure, for example.

The engine 12 includes an enclosure 20 and one or more cylinders 22, as shown in FIGS. 1 and 2. The air-fuel mixture from the carburetor induction system 14 and the EFI system 16 flows into the enclosure 20 and then into the one or more cylinders 22. The engine 12 further includes an intake port 24 and a valve 26 for each of the one or more cylinders 22. The intake port 24 is in fluid communication with the enclosure 20 and the corresponding cylinder 22 to direct the air-fuel mixture into the corresponding cylinder 22 from the enclosure 20. The enclosure 20 may be referred to an as intake manifold in the art.

The carburetor induction system 14 is fluidly coupled to the engine 12 and is configured to selectively provide a naturally-aspirated air-fuel mixture to the one or more cylinders 22 while the engine system 10 is in the carburetor mode, as shown in FIG. 1. The carburetor induction system 14 includes a chamber 28, an orifice 30, an intake manifold 32, and a venturi 34. The chamber 28 is in fluid communication with a fuel tank 36 of the engine system 10 that stores fuel therein. The chamber 28 receives a naturally-aspirated fuel flow via a fuel line 38 extending between the fuel tank 36 and the chamber 28.

The chamber 28 includes a float 40 therein, as shown in FIGS. 1 and 2. When the desired level of the naturally-aspirated fuel flow is reached in the chamber 28, the float 40 moves and stops the direction of the naturally-aspirated fuel flow into the chamber 28 via a needle valve.

The orifice 30 is fluidly coupled to the chamber 28 and the intake manifold 32 to direct the naturally-aspirated fuel flow from the chamber 28 and into the intake manifold 32, as suggested in FIG. 1. A fuel on/off valve 31 is included in the chamber 28 to adjust and control the naturally-aspirated fuel flow to the orifice 30. When the fuel on/off valve 31 is open, the naturally-aspirated fuel flow is free to flow through the orifice 30 and into the intake manifold 32. When the fuel on/off valve 31 is closed, the naturally-aspirated fuel flow is blocked from flowing through the orifice 30 and into the intake manifold 32.

The intake manifold 32 receives air from the environment, as suggested in FIGS. 1 and 2. The venturi 34 is located in the intake manifold 32. Illustratively, the venturi 34 is a restricted portion or a throat portion of the intake manifold 32. As the air flows through the venturi 34, the velocity of the air increases while the pressure of the air decreases from a first pressure (i.e., a pressure of ambient air) to a second pressure less than the first pressure. The second pressure of the air is less than a third pressure (i.e., a pressure of ambient air) in the chamber 28. Due to the pressure differential between the second and third pressures, the naturally-aspirated fuel flow is drawn through the orifice 30 (while the fuel on/off valve 31 is open) and directed into the venturi 34, as suggested in FIG. 1. The drop in air pressure through the venturi 34 creates suction to draw the naturally-aspirated fuel flow into the intake manifold 32. In this way, the intake manifold 32 receives the naturally-aspirated fuel flow from the chamber 28. The naturally-aspirated fuel flow and the air mix in the intake manifold 32 and are then directed into the enclosure 20 for delivery to the one or more cylinders 22.

In some embodiments, the carburetor induction system 14 further includes a throttle valve 44, as shown in FIGS. 1 and 2. The throttle valve 44 is configured to move to adjust an amount of the air-fuel mixture flowing out of the intake manifold 32 and into the enclosure 20.

In some embodiments, the carburetor induction system 14 further includes a pump 46 fluidly coupled to the chamber 28 via a vent line 48, as shown in FIGS. 1 and 2. The pump 46 may be referred to as a mixture control pump 46. The pump 46 is configured to remove chamber air from the chamber 28 to decrease pressure in the chamber 28 (i.e., to decrease the pressure in the chamber 28 from the third pressure to a fourth pressure that is less than the third pressure) while the engine system 10 is in the carburetor mode. Decreasing the pressure in the chamber 28 results in a lower pressure differential between the second and fourth pressures so that an amount of the naturally-aspirated fuel flow directed into the intake manifold 32 is decreased. With the decreased amount of the naturally-aspirated fuel flow, a leaner air-fuel mixture is provided to the engine 12, thereby resulting in optimized efficiency of the engine system 10.

The EFI system 16 is fluidly coupled to the engine 12 and configured to selectively provide an electronically-controlled air-fuel mixture to the one or more cylinders 22 while the engine system 10 is in the EFI mode, as shown in FIG. 2. The EFI system 16 includes a pump 52 and one or more fuel injectors 54. The pump 52 and the fuel injector 54 are fluidly connected to the fuel tank 36 of the engine system 10 via a fuel line 42. The fuel line 42 is connected to the fuel tank 36 and the one or more fuel injectors 54.

During a flight using a typical aircraft engine, the air-fuel mixture control must be manually adjusted by the pilot over the course of the flight to compensate for different air densities and/or different operating conditions, such as, for example, different altitudes and/or power settings. For example, take-off might be carried out using a high power throttle setting and a rich air-fuel mixture to provide power and cooling, then the power may be reduced and the air-fuel mixture leaned slightly for climbing to a desired altitude, and then the power may be further reduced and the air-fuel mixture further leaned for cruising. Subsequent changes in altitude, power settings, etc. will require further adjustments to the air-fuel mixture, either enriching or leaning the air-fuel mixture. Some aircrafts have engine monitoring systems to assist the pilot, but the pilot must manually adjust the air-fuel mixture, which imposes an additional workload on the pilot that may impact safety due to the pilot's continual attention to the air-fuel mixture adjustments. Often, air-fuel mixture adjustments are made late and are not very precise.

The EFI system 16, thus, provides precise real-time automatic mixture control in response to changing conditions, such as air density, operating conditions, and/or power settings, which reduces pilot work load. By ensuring that the engine 12 runs at the proper air-fuel mixture, the present engine system 10 improves the durability of the engine 12, which leads to longer times between overhauls and reduced costs. The engine system 10 avoids problems caused by the pilot forgetting to adjust the air-fuel mixture, which can lead to spark plug fouling, fuel exhaustion, and/or engine damage due to detonation or overheating.

The pump 52 of the EFI system 16 selectively draws the electronically-controlled fuel flow from the fuel tank 36, as shown in FIG. 2. The fuel injector 54 receives the electronically-controlled fuel flow from the pump 52 and injects the electronically-controlled fuel flow into the intake manifold 32. The fuel injector 54 is controlled by the controller 18 to provide the correct amount of fuel. In some embodiments, the fuel injector 54 is located upstream of the orifice 30 and/or the venturi 34 of the carburetor induction system 14. In some embodiments, the fuel injector 54 is located upstream of the throttle valve 44. In some embodiments, a nozzle separate from the fuel injector 54 is located near and/or upstream of the throttle valve 44. In some embodiments, the fuel injector 54 is located elsewhere in the engine system 10.

In some embodiments, the engine system 10 further includes a heating unit 50, as shown in FIGS. 1 and 2. The heating unit 50 is configured to supply heated air to the intake manifold 32, as suggested in FIGS. 1 and 2. The heating unit 50 is configured to change between an on mode in which the heated air is directed into the intake manifold 32 and an off mode in which the heated air is not directed into the intake manifold 32. In some embodiments, the heating unit 50 may be further adjustable to control how much heated air is being directed into the intake manifold 32. For example, in some embodiments, the heating unit 50 includes a valve configured to open, close, and incrementally move to different positions to adjust and control a flow rate of heated air into the intake manifold 32.

In some operating conditions and/or weather conditions, ice, which may be referred to as carb ice, may form in the carburetor induction system 14. Ice formation may be caused by a temperature drop, which may be an effect of fuel vaporization and/or a temperature drop associated with the pressure drop of the air in the venturi 34. Water vapor may freeze on the throttle valve 44 and/or other surfaces of the carburetor induction system 14, which presents many problems for the engine system 10.

Some EFI systems may not require heated air because the fuel is injected near the engine's hot cylinders. However, the EFI system 16 of the present engine system 10 injects the electronically-controlled fuel flow into the intake manifold 32 upstream of the orifice 30 or upstream of the throttle valve 44 such that ice is more likely to form than in traditional EFI systems.

Thus, the heating unit 50 directs the heated air into the intake manifold 32 to prevent or minimize the formation of ice. In some embodiments, the heated air is drawn from an exhaust heat of the engine 12 (not the exhaust gases as the exhaust gases contain little to no oxygen after combustion). As the engine 12 burns the air-fuel mixture, it generates heat in the muffler. This heated air from the exterior around the muffler may be directed to the intake manifold 32 via the heating unit 50.

The heated air from the heating unit 50 also helps to equalize the one or more cylinders 22, which allows for a leaner air-fuel mixture to be used. The heated air improves atomization/vaporization of the fuel, which enhances fuel air uniformity and, thus, mixture equalization between the one or more cylinders 22. Thus, the heating unit 50 saves fuel, provides for enhanced durability of the engine 12 as it is fueled more properly, and provides for safer use of the engine system 10 as ice buildup is properly dealt with and/or prevented.

In some embodiments, a temperature sensor is located within the intake manifold 32 near the throttle valve 44. The temperature sensor is in communication with the controller 18. Based on inputs from the temperature sensor, the controller 18 adjusts the flow rate of heated air into the intake manifold 32 via the valve of the heating unit 50. In this way, the controller 18 and the heating unit 50 provide a closed-loop variable air inlet temperature control system.

In some embodiments, the heating unit 50 is manually controlled. In some embodiments, the heating unit 50 is automatically controlled (closed-loop). The heating unit 50 adjusts and controls inlet air temperature to prevent icing problems. The heating unit 50 also enhances atomization/vaporization while being used in the carburetor mode and in the EFI mode, thus improving the combustion process for more complete burning and thereby providing fuel savings, enhanced durability, and safety in both the carburetor mode and the EFI mode.

The desired air temperature is provided at the engine inlet due to fuel evaporative cooling and carb heat. This provides manufacturer expected power, at a minimum, due to equalized individual cylinder powers and improved mixture control due to EFI automation.

The controller 18 is in communication with both the carburetor induction system 14 and the EFI system 16, as shown in FIGS. 1 and 2. The controller 18 sends instructions to the systems 14, 16 to change the engine system 10 between the carburetor mode and the EFI mode. In some embodiments, the controller 18 includes a memory 66, a processor 68, and a user interface 70, as shown in FIGS. 1 and 2. The memory 66 may have instructions stored therein which, when executed by the processor 68, cause the processor 68 to control the carburetor induction system 14 and the EFI system 16 to change between the carburetor mode and the EFI mode. The processor 68 may control components of the engine system 10 based on instructions stored in the memory 66, inputs from the pilot, or a combination of the same. For example, the user interface 70 may allow the pilot to manually control components of the engine system 10.

While in the carburetor mode, the controller 18 instructs the pump 52 and the fuel injector 54 of the EFI system 16 to turn off. The controller 18 also instructs the fuel on/off valve 31 to open.

The air enters the intake manifold 32 and passes through the venturi 34, as shown in FIG. 1. In doing so, the naturally-aspirated fuel flow is drawn from the chamber 28 and into the intake manifold 32. The air and the naturally-aspirated fuel flow mix with one another in the intake manifold 32 to form the naturally-aspirated air-fuel mixture. The naturally-aspirated air-fuel mixture is provided to the engine 12.

In some embodiments, the controller 18, while the engine system 10 is in the carburetor mode, instructs the pump 46 to draw the chamber air out of the chamber 28 (i.e., apply a vacuum to the chamber air). As previously described, this will cause the amount of the naturally-aspirated fuel flow that is drawn into the intake manifold 32 to decrease thereby providing a leaner air-fuel mixture to the engine 12. In exemplary embodiments, the pump 46 is only operated during the carburetor mode. The controller 18 may instruct the pump 46 to draw the chamber air out of the chamber 28 based on the operating conditions of the aircraft, inputs from at least one sensor 72, or inputs from the pilot. The operating conditions of the aircraft may be determined based on inputs from the at least one sensor 72, inputs from the pilot, or a combination of the same.

The at least one sensor 72 may include a manifold absolute pressure (MAP) sensor, a mass airflow (MAF) sensor, an intake air temperature (IAT) sensor, a tachometer, an exhaust gas temperature (EGT) sensor, any other suitable sensor, or a combination of the same. In some embodiments, the at least one sensor 72 is used to determine the engine's revolutions per minute (RPM) and/or manifold pressure to determine power.

In some embodiments, the controller 18, while the engine system 10 is in the carburetor mode, instructs the heating unit 50 to direct the heated air into the intake manifold 32. In some embodiments, the controller 18 instructs the heating unit 50 to remain on and supply the heated air to the intake manifold 32 in the carburetor mode and the EFI mode such that the heating unit 50 is always on. In some embodiments, the controller 18 instructs the heating unit 50 to direct the heated air to the intake manifold 32 in response to operating conditions of the aircraft, inputs from the pilot, and/or inputs from the at least one sensor 72, such as RPM, environmental conditions, etc.

While in the EFI mode, the controller 18 instructs the fuel on/off valve 31 to close such that the naturally-aspirated fuel flow is not directed into the intake manifold 32 from the chamber 28, as shown in FIG. 2. The valve 44 is operated and adjusted in both modes. The controller 18 may also instruct the valve 44 to move to a specific position based on, for example, operating conditions.

The controller 18 instructs the pump 52 and the fuel injector 54 of the EFI system 16 to turn on. The air enters the intake manifold 32 and passes through the venturi 34. The electronically-controlled fuel flow is drawn from the fuel tank 36 to the fuel injector 54 via the pump 52. The electronically-controlled fuel flow is then injected into the intake manifold 32. The air and the electronically-controlled fuel flow mix with one another in the intake manifold 32 to form the electronically-controlled air-fuel mixture. The electronically-controlled air-fuel mixture is provided to the engine 12. In some embodiments, the controller 18, while the engine system 10 is in the EFI mode, instructs the heating unit 50 to direct the heated air into the intake manifold 32.

In some embodiments, the controller 18 directs the engine system 10 to change from the EFI mode to the carburetor mode in response to inputs from at least one sensor 74 and/or the at least one sensor 72, as shown in FIGS. 1 and 2. The inputs from the at least one sensor 74 are indicative of EFI system 16 failure or inoperability. For example, if the pump 52 is not properly operating, the controller 18 receives inputs from the at least one sensor 74 indicative of the same. The inputs may be related to pressure of the electronically-controlled fuel flow and/or volume of electronically-controlled fuel flow. As another example, if the fuel injector 54 is not properly operating, the controller 18 receives inputs from the at least one sensor 72, 74 indicative of the same. The inputs may be related to pressure of the electronically-controlled fuel flow, volume of electronically-controlled fuel flow, EGT temperatures, cylinder temperatures, engine power indications, etc. In this way, the controller 18 can switch the engine system 10 to its backup carburetor mode.

The carburetor induction system 14 maintains fuel in the chamber 28 to facilitate changing from the EFI mode to the carburetor mode with minimal engine hesitation. An independent electronic fuel injection cut-off switch may be used, if desired, to ensure completely independent carburetion operation, i.e., to ensure that the EFI system 16 is inoperative when it is desired to use the carburetor induction system 14.

Figure 3:
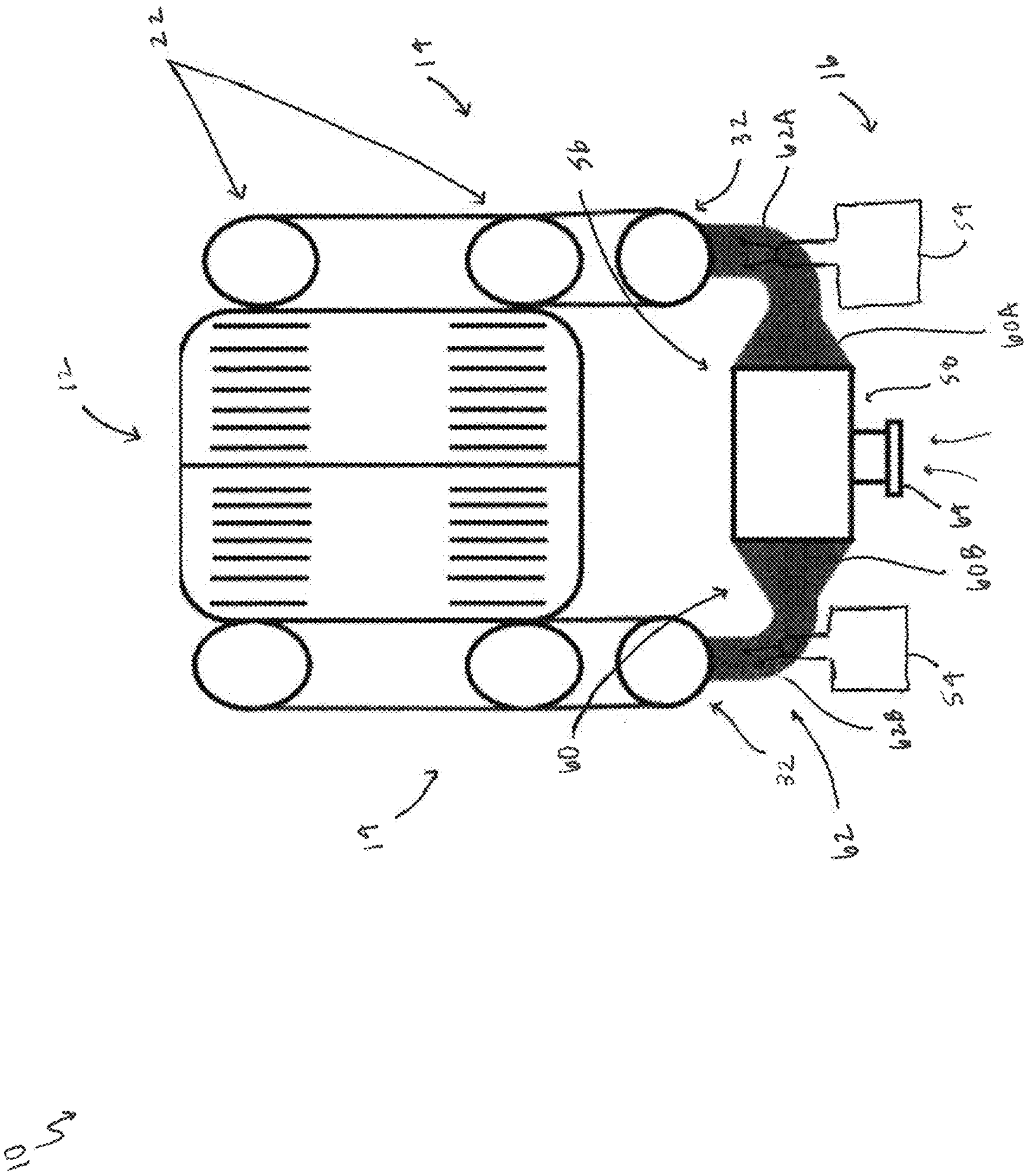
FIG. 3 is a diagrammatic view of the engine system of FIG. 1 showing that the engine system further includes a plenum coupled to the intake manifold and having a tapered section that dampens pressure pulses in the intake manifold thereby evening out volumetric efficiency between cylinders of the engine, which improves safety, improves fuel efficiency, improves durability, and reduces vibration.

In some embodiments, the carburetor induction system 14 includes a plenum 56, as shown in FIG. 3. The plenum 56 may be used with a Rotax 912 engine or any other suitable engine. The plenum 56 is configured to direct the air into the intake manifold 32. The plenum 56 includes a main section 58, a tapered section 60, and a curved section 62. The main section 58 is formed to define an inlet 64 to receive the air from the environment. In some embodiments, the inlet 64 includes a floatless carburetor (not shown) configured to open and close the inlet 64. The tapered section 60 is coupled to and between the main section 58 and the curved section 62 to direct the air from the main section 58 and into the curved section 62. The tapered section 60 illustratively decreases in diameter as the tapered section 60 extends from the main section 58 to the curved section 62. The curved section 62 is coupled to and between the tapered section 60 and the intake manifold 32 to direct the air from the tapered section 60 and into the intake manifold 32.

In some embodiments, the curved section 62 forms about a 90-degree angle to interconnect the tapered section 60 and the intake manifold 32, as shown in FIG. 3. In some embodiments, the plenum 56 is formed of aluminum. In some embodiments, the plenum 56 is 3D-printed. In some embodiments, an air filter is located on the inlet 64 of the main section 58 of the plenum 56.

In some embodiments, the engine system 10 includes two carburetor induction systems 14 and one EFI system 16 having the one or more fuel injectors 52, as shown in FIG. 3. In such an embodiment, the plenum 56 extends between and interconnects the intake manifold 32 of each of the carburetor induction systems 14 such that the inlet 64 provides the air to both intake manifolds 32.

In such an embodiment, the tapered section 60 illustratively includes a first tapered section 60A and a second tapered section 60B, and the curved section 62 illustratively includes a first curved section 62A and a second curved section 62B, as shown in FIG. 3. The first tapered section 60A extends between the main section 58 and the first curved section 62A, and the first curved section 62A extends between the first tapered section 60A and one of the intake manifolds 32. The second tapered section 60B extends between the main section 58 and the second curved section 62B, and the second curved section 62B extends between the second tapered section 60B and the other of the intake manifolds 32. One fuel injector 54 of the EFI system 16 is coupled to each of the curved sections 62A, 62B to direct the electronically-controlled fuel flow into the corresponding intake manifold 32 while the engine system 10 is in the EFI mode (in other words, the EFI system 16 includes one fuel injector 54 for each curved section 62A, 62B).

In traditional engines, opening and closing of an inlet valve at the inlet of the intake manifold may cause pressure pulses within the intake manifold. For example, the opening and closing of the intake valve as the air is attempting to flow into the intake manifold/cylinder area creates a pressure pulse. The pressure pulse occurs in each cylinder coupled to that intake manifold such that the pressure pulse from each cylinder must travel a different length in the different length intake manifolds, which creates timing issues as the pressure pulses from each cylinder are not entering and exiting the intake manifold at the same time. The timing issues result in either too much air entering the individual cylinders or not enough air entering the individual cylinders. Thus, the air-fuel mixture may be too lean or too rich, and volumetric efficiencies vary thereby leading to uneven power and mixtures.

Thus, the plenum 56 acts as a damper for the pressure pulses. In other words, the tapered section 60 minimizes the impact of the pressure pulses. The plenum 56 provides additional space for the pressure pulses to diminish. The plenum 56 evens out the volumetric efficiency between the cylinders, which improves fuel efficiency, engine durability, and safety. In some embodiments, inside surfaces of the plenum 56 are formed to include acoustic dampening material.

As shown in FIG. 3, the engine 12 includes four cylinders 22. The engine 12 may include any number of cylinders, such as six cylinders or eight cylinders. As will be appreciated by those skilled in the art, the present disclosure provides the EFI system 16 that may be economically installed as original equipment or as a retrofit improvement to an existing engine system 10. For example, the pump 52 and the two fuel injectors 54 may be retrofit onto an existing engine system 10. In this way, a significant cost advantage is provided to the user as the carburetor induction system 12 may be preexisting. Further, the carburetor induction system 12 may use preexisting components that have a long history of accepted use and safety in the market. For example, using preexisting components provides known reliability that has been proven over time.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An engine system for an aircraft, the engine system comprising an engine having a plurality of cylinders configured to receive an air-fuel mixture, a carburetor induction system fluidly coupled to the engine and configured to selectively provide a naturally-aspirated air-fuel mixture to the plurality of cylinders, the carburetor induction system including a chamber into which a naturally-aspirated fuel flow from a fuel tank is drawn, an intake manifold that receives air from an environment and selectively receives the naturally-aspirated fuel flow from the chamber, and a venturi located in the intake manifold through which the air and the naturally-aspirated fuel flow is received, an electronic fuel injection (EFI) system fluidly coupled to the engine and configured to selectively provide an electronically-controlled air-fuel mixture to the plurality of cylinders, the EFI system including a pump that selectively draws an electronically-controlled fuel flow from the fuel tank and a fuel injector that receives the electronically-controlled fuel flow from the pump and injects the electronically-controlled fuel flow into the intake manifold, and a controller configured to change the engine system between (i) a carburetor mode in which the venturi draws the naturally-aspirated fuel flow into the intake manifold from the chamber to mix with the air therein and provide the naturally-aspirated air-fuel mixture to the plurality of cylinders while the fuel injector does not inject the electronically-controlled fuel flow into the intake manifold and (ii) an EFI mode in which the pump draws the electronically-controlled fuel flow from the fuel tank for injection into the intake manifold via the fuel injector to mix with the air therein and provide the electronically-controlled air-fuel mixture to the plurality of cylinders while the venturi does not draw the naturally-aspirated fuel flow into the intake manifold from the chamber, wherein the carburetor induction system includes a pump fluidly coupled to the chamber and configured to remove chamber air from the chamber to decrease pressure in the chamber while the engine system is in the carburetor mode so that an amount of the naturally-aspirated fuel flow directed into the intake manifold is decreased thereby providing a leaner air-fuel mixture to the engine so that the efficiency of the engine system can be increased.

2. The engine system of claim 1, wherein the carburetor induction system further includes a plenum configured to direct the air into the intake manifold, the plenum including a main section having an inlet to receive the air from the environment and a tapered section coupled to the main section and the intake manifold to direct the air from the main section and into the intake manifold, the tapered section decreasing in diameter from the main section to the intake manifold.

3. The engine system of claim 1, further comprising a heating unit configured to supply heated air to the intake manifold.

4. The engine system of claim 3, wherein the controller is in communication with the heating unit and is configured to change the heating unit between an on mode in which the heated air is directed to the intake manifold and an off mode in which the heated air is not directed to the intake manifold.

5. The engine system of claim 4, wherein the controller is configured to change the heating unit to the on mode to direct the heated air from the heating unit to the intake manifold while the engine system is in the carburetor mode and the EFI mode.

6. The engine system of claim 1, wherein the pump of the EFI system and the fuel injector of the EFI system are retrofit onto the aircraft.

7. The engine system of claim 1, wherein the fuel injector of the EFI system is located upstream of the venturi of the carburetor induction system.

8. The engine system of claim 1, wherein the controller is in communication with the pump of the carburetor induction system, and wherein the controller is configured to direct the pump of the carburetor induction system to remove the chamber air from the chamber in response to inputs from at least one sensor indicative of operating conditions of the aircraft.

9. The engine system of claim 8, wherein the at least one sensor comprises a manifold absolute pressure (MAP) sensor, a mass airflow (MAF) sensor, an intake air temperature (IAT) sensor, or a tachometer.

10. The engine system of claim 1, wherein the controller is configured to change the engine system from the EFI mode to the carburetor mode in response to inputs from at least one sensor indicative of failure of the pump of the EFI system or the fuel injector of the EFI system.

11. An engine system for an aircraft, the engine system comprising an engine having a plurality of cylinders configured to receive an air-fuel mixture, a carburetor induction system fluidly coupled to the engine and configured to selectively provide a naturally-aspirated air-fuel mixture to the plurality of cylinders, the carburetor induction system including a chamber into which a naturally-aspirated fuel flow from a fuel tank is drawn, an intake manifold that receives air from an environment and selectively receives the naturally-aspirated fuel flow from the chamber, a venturi located in the intake manifold through which the air and the naturally-aspirated fuel flow is received, and a pump fluidly coupled to the chamber and configured to remove chamber air from the chamber to decrease pressure in the chamber so that an amount of the naturally-aspirated fuel flow directed into the intake manifold is decreased thereby providing a leaner air-fuel mixture to the engine so that the efficiency of the engine system can be increased, and a controller in communication with the pump and configured to adjust an amount of the chamber air removed from the chamber by the pump based, at least in part, on operating conditions of the aircraft.

12. The engine system of claim 11, wherein the carburetor induction system further includes a plenum configured to direct the air into the intake manifold, the plenum including a main section having an inlet to receive the air from the environment and a tapered section coupled to the main section and the intake manifold to direct the air from the main section and into the intake manifold, the tapered section decreasing in diameter from the main section to the intake manifold.

13. The engine system of claim 11, further comprising a heating unit configured to supply heated air to the intake manifold.

14. The engine system of claim 13, wherein the controller is in communication with the heating unit and is configured to change the heating unit between an on mode in which the heated air is directed to the intake manifold and an off mode in which the heated air is not directed to the intake manifold.

15. The engine system of claim 14, wherein the controller is configured to change the heating unit to the on mode to direct the heated air from the heating unit to the intake manifold during all operating conditions of the aircraft.

16. The engine system of claim 11, further comprising at least one sensor in communication with the controller and configured to provide inputs to the controller indicative of the operating conditions of the aircraft.

17. The engine system of claim 11, further comprising an electronic fuel injection (EFI) system fluidly coupled to the engine and configured to selectively provide an electronically-controlled air-fuel mixture to the plurality of cylinders, the EFI system including a pump that selectively draws an electronically-controlled fuel flow from the fuel tank and a fuel injector that receives the electronically-controlled fuel flow from the pump and injects the electronically-controlled fuel flow into the intake manifold.

18. The engine system of claim 17, wherein the controller is configured to change the engine system between (i) a carburetor mode in which the venturi draws the naturally-aspirated fuel flow into the intake manifold from the chamber to mix with the air therein and provide the naturally-aspirated air-fuel mixture to the plurality of cylinders while the fuel injector does not inject the electronically-controlled fuel flow into the intake manifold and (ii) an EFI mode in which the pump draws the electronically-controlled fuel flow from the fuel tank for injection into the intake manifold via the fuel injector to mix with the air therein and provide the electronically-controlled air-fuel mixture to the plurality of cylinders while the venturi does not draw the naturally-aspirated fuel flow into the intake manifold from the chamber.

19. The engine system of claim 18, wherein a fuel injector nozzle of the EFI system is located upstream of a throttle valve of the carburetor induction system located within the intake manifold.

20. The engine system of claim 17, wherein the pump of the EFI system and the fuel injector of the EFI system are retrofit onto the aircraft.

* * * * *